US007340337B2

(12) United States Patent
Katrak

(10) Patent No.: US 7,340,337 B2
(45) Date of Patent: Mar. 4, 2008

(54) VEHICLE CONTROL SYSTEM FOR DETECTING A SHORT-CIRCUIT CONDITION BETWEEN REDUNDANT POSITION SENSORS

(75) Inventor: Kerfegar K. Katrak, Fenton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 247 days.

(21) Appl. No.: 11/077,470

(22) Filed: Mar. 10, 2005

(65) Prior Publication Data

US 2006/0206252 A1 Sep. 14, 2006

(51) Int. Cl.
*G06F 7/70* (2006.01)

(52) U.S. Cl. .......................... 701/70; 701/34; 123/376

(58) Field of Classification Search .................. 701/70, 701/29, 34, 35; 123/361, 376, 399; 702/185; 73/181.1, 119 R
See application file for complete search history.

(56) References Cited

U.S. PATENT DOCUMENTS

| | | | | |
|---|---|---|---|---|
| 5,602,732 | A * | 2/1997 | Nichols et al. | 701/29 |
| 6,065,448 | A * | 5/2000 | Hatton et al. | 123/396 |
| 6,397,816 | B1 * | 6/2002 | Pursifull | 123/399 |

* cited by examiner

*Primary Examiner*—Mark Hellner

(57) ABSTRACT

A control system includes a device having a position between minimum and maximum positions. First and second sensor modules sense the position of the device and generate first and second position values. A control module receives the position values and computes first and second normalized position values that represent a fraction of a range between minimum and maximum values of the first position value and between minimum and maximum values of the second position value. The control module suspends a control procedure that is based on at least one of the first normalized position value and/or the second normalized position value while a difference between the first and second normalized position values is greater than or equal to a first predetermined value and while at least one of the first normalized position value and/or the second normalized position value is less than or equal to a second predetermined value.

16 Claims, 7 Drawing Sheets

| Parameter | Min. (Ω) | Nom. (Ω) | Max. (Ω) | Tol. - Nom. (%) | Max./Min. Ratio |
|---|---|---|---|---|---|
| PPS1 Sensor Resistance | 800 | 1200 | 1600 | 33.33 | 2.00 |
| PPS1 Series Resistance | 600 | 1000 | 1400 | 40.00 | 2.33 |
| PPS1 Series + Contact Resistance | 750 | 1000 | 3900 | N/A | 5.20 |
| PPS2 Sensor Resistance | 1500 | 1700 | 2500 | -11.77/47.06 | 1.67 |
| PPS2 Series Resistance | 600 | 1000 | 1400 | 40.00 | 2.33 |
| PPS2 Series + Contact Resistance | 750 | 1000 | 3900 | -25.00/290.00 | 5.20 |
| Contact Resistance | 150 | N/A | 2500 | N/A | |

FIG. 5

VEHICLE CONTROL SYSTEM FOR DETECTING A SHORT-CIRCUIT CONDITION BETWEEN REDUNDANT POSITION SENSORS

FIELD OF THE INVENTION

The present invention relates to vehicle control systems, and more particularly to redundant position sensing of devices in vehicle control systems.

BACKGROUND OF THE INVENTION

Vehicle manufacturers are increasingly replacing mechanical linkages in vehicles with sensors and electromechanical devices to reduce weight and cost. For example, sensors are replacing mechanical linkages to detect positions of user operated devices such as accelerator, clutch, and brake pedals. Signals are transmitted from the sensors to controllers and/or electromechanical devices in the vehicle. For example, a signal from an accelerator pedal may be transmitted to an actuator in the electronic throttle body to adjust the position of the throttle blade. Additionally, a throttle position sensor detects the position of the throttle blade and transmits a signal to an engine control module.

In cases where mechanical linkages are at least partially eliminated, multiple sensors are commonly used to perform redundant measurements and ensure system accuracy. For example, some manufacturers use analog position sensors that are based on a resistive ink or paste that is deposited on a non-conducting substrate. Other manufacturers use application specific integrated circuits (ASICs) in combination with sensors. The sensors typically include hall effect or inductively coupled sensors. The ASICs receive analog signals from the sensors and output pulse width modulated (PWM) or other types of signals.

Referring to FIG. 1, a vehicle control system 10 includes an accelerator pedal module 12, a control module 14, and an electronic throttle body (ETB) 16. The accelerator pedal module 12 includes first and second sensor modules 18 and 20, respectively, that communicate with the control module 14. The accelerator pedal module 12 also includes an accelerator pedal 22 that is in mechanical contact with the sensor modules 18 and 20. The sensor modules 18 and 20 are potentiometer-based sensors that include adjustable sensor resistances. During normal operations, a driver moves the accelerator pedal 22 between a minimum and a maximum position. For example, the accelerator pedal 22 may be in the minimum position when the driver does not make contact with the accelerator pedal 22. Accordingly, the accelerator pedal 22 may be in the maximum position when the driver presses down all the way on the accelerator pedal 22. As the accelerator pedal 22 moves between the minimum and maximum positions, mechanical contacts 24 between the accelerator pedal 22 and the sensor modules 18 and 20 adjust the values of the sensor resistances.

The sensor modules 18 and 20 generate respective position signals 26 and 28 based on the values of respective sensor resistances. The sensor modules 18 and 20 transmit the position signals 26 and 28 to the control module 14. The control module 14 determines first and second positions of the accelerator pedal 22 based on values of the position signals 26 and 28. The control module 14 may first convert values of the first and second position signals 26 and 28, respectively, into normalized position values representing a fraction of a range between minimum and maximum values of respective position signals 26 and 28. For example, the control module 14 may store values of the position signals 26 and 28 when the accelerator pedal 22 is set at predetermined positions during a calibration process.

Alternatively, the control module 14 may store minimum and maximum values of the position signals 26 and 28 that are learned during normal operations. This allows the control module 14 to determine the values of the position signals 26 and 28 by scaling between the preset values. Since the control module 14 determines multiple position values, the control module 14 may perform redundancy testing to verify the integrity of the sensor modules 18 and 20. The control module 14 adjusts a position of a throttle blade in the ETB 16 based on at least one of the value of the first position signal 26 and/or the value of the second position signal 28.

In the event of an electrical short-circuit between the first and second sensor modules 18 and 20, respectively, one or both of the values of the position signals 26 and 28 may become invalid, which adversely affects vehicle control. In one approach, the first sensor module 18 includes a short-circuit switch 30. When activated by the control module 14, the short-circuit switch 30 sets the value of the first position signal 26 to a predetermined value. For example, the value of the first position signal 26 may be set by shorting the sensor resistance of the first sensor module 18 to a reference or ground potential. While the short-circuit switch 30 is activated, the control module 14 compares the values of the first and second position signals 26 and 28, respectively. If the difference between the values of the position signals 26 and 28 is less than a predetermined value, it is likely that a short-circuit condition exists between the sensor modules 18 and 20 and the control module 14 may activate an alarm indicator.

The short-circuit switch 30 allows the control module 14 to periodically detect a short-circuit condition between the sensor modules 18 and 20. However, the accuracy of the values of the position signals 26 and 28 is compromised while the short-circuit switch 30 is activated. This interrupts other system diagnostics that utilize the values of the position signals 26 and 28 from the sensor modules 18 and 20. Additionally, the short-circuit switch 30 provides added cost and complexity to the sensor modules 18 and 20.

SUMMARY OF THE INVENTION

A control system according to the present invention includes a device having a position between minimum and maximum positions. First and second sensor modules sense the position of the device and generate first and second position values, respectively. A control module receives the first and second position values and computes first and second normalized position values that represent a fraction of a range between minimum and maximum values of the first position value and between minimum and maximum values of the second position value, respectively. The control module suspends a control procedure that is based on at least one of the first normalized position value and/or the second normalized position value while a difference between the first and second normalized position values is greater than or equal to a first predetermined value and while at least one of the first normalized position value and/or the second normalized position value is less than or equal to a second predetermined value.

In other features, the first and second position values increase as the device moves from the minimum position to the maximum position. A minimum value of the first position value is greater than a minimum value of the second position value, and a maximum value of the first position value is greater than a maximum value of the second position value. The first and second position values increase at different rates as the device moves from the minimum position to the maximum position.

In still other features of the invention, the first predetermined value increases as the device moves from the minimum position to the maximum position. The control module activates an alarm indicator when the difference between the first and second normalized position values is greater than or equal to the first predetermined value for a predetermined time period. The control module conducts the control procedure based on the lower of the first or second normalized position values when the difference between the first and second normalized position values is greater than or equal to the first predetermined value and the first and second normalized position values are both greater than the second predetermined value. The control module conducts the control procedure based on an average of the first and second normalized position values when the difference between the first and second normalized position values is less than the first predetermined value.

In yet other features, after the control module previously detects that the difference between the first and second normalized position values is greater than or equal to the first predetermined value, the control module conducts the control procedure based on the lower of the first or second normalized position values when the control module subsequently detects that the difference between the first and second normalized position values is less than the first predetermined value. The first and second sensor modules include first and second sensor resistances, respectively. Values of the first and second sensor resistances both one of increase or decrease as the device moves from the minimum position to the maximum position. The first and second sensor modules generate the first and second position values based on the first and second sensor resistances, respectively. The first and second sensor resistances are generated during a resistive ink deposition process.

In still other features of the invention, first and second conductors have first ends that communicate with the first and second sensor modules, respectively, and second ends that communicate with the control module. The first sensor module transmits the first position values on the first conductor and the second sensor module transmits the second position values on the second conductor. The device is one of an accelerator pedal, a brake pedal, a clutch pedal, or a throttle blade of a vehicle. The device is an accelerator pedal, and the control module adjusts a position of a throttle blade of the vehicle during the control procedure. The first predetermined value is greater than or equal to 0.05 and the second predetermined value is less than or equal to 0.09.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a table that illustrated exemplary values of resistors in the pedal position sensors of FIG. 3;

DETAILED DESCRIPTION OF THE PREFERRED EMBODIMENTS

Figure 1:
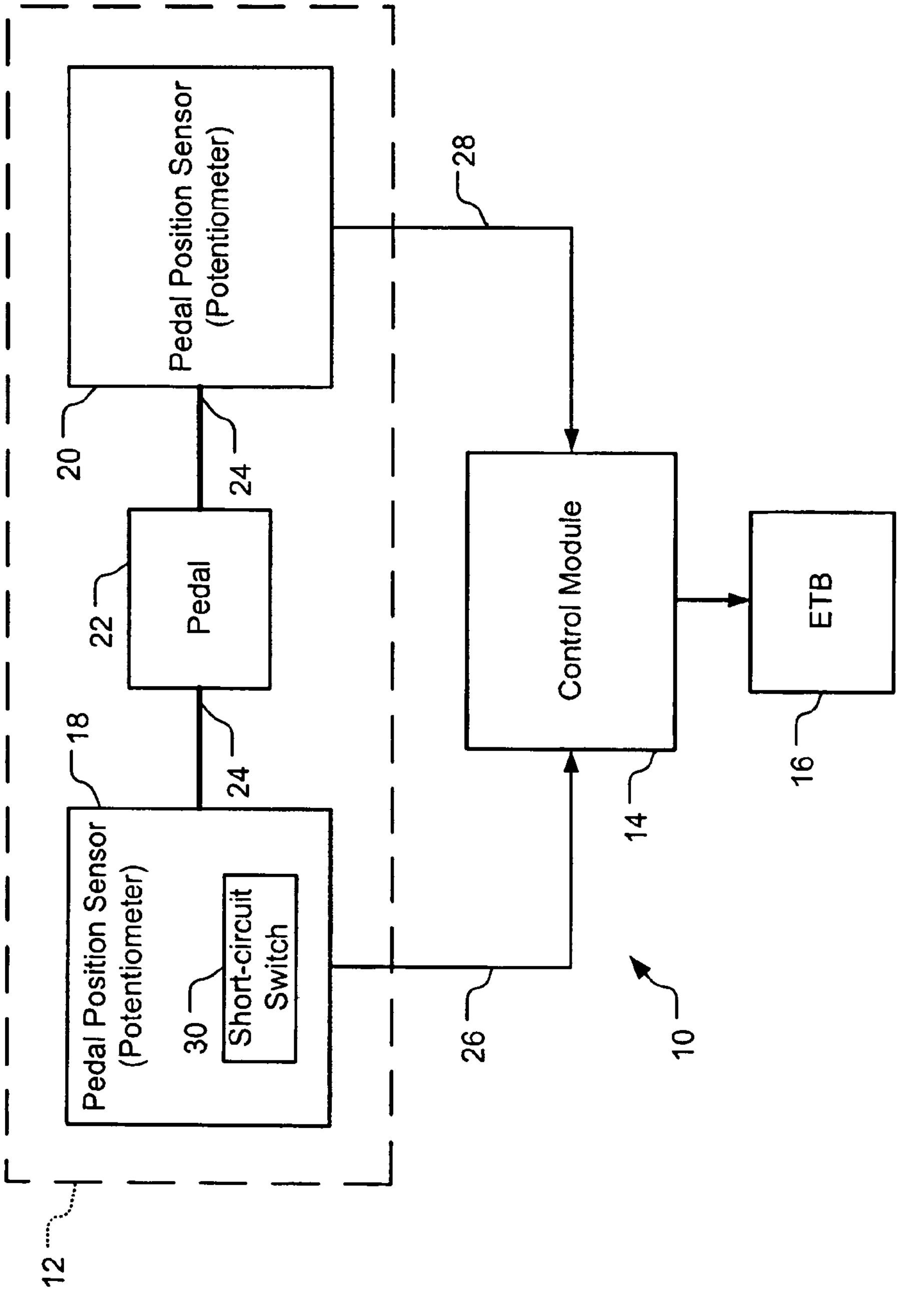
FIG. 1 Prior Art
FIG. 1 is a functional block diagram of an accelerator pedal module, a control module, and an electronic throttle body in a vehicle control system that performs redundant position sensing according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 2:
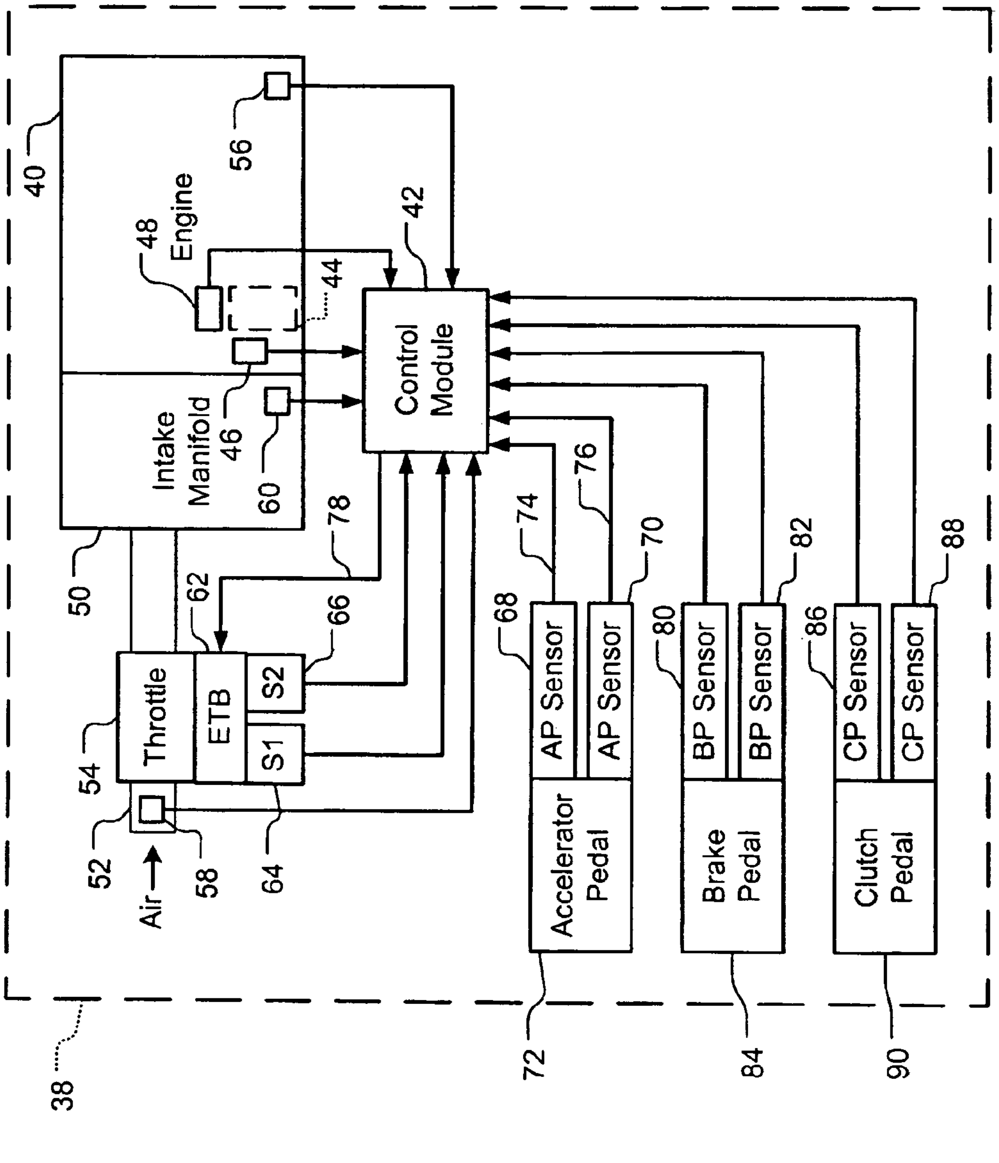
FIG. 2 is a functional block diagram of a vehicle control system including a control module that receives signals from vehicle sensors according to the present invention.

Referring now to FIG. 2, a vehicle 38 includes an engine 40 and a control module 42. The engine 40 includes a cylinder 44 that has a fuel injector 46 and a spark plug 48. Although a single cylinder 44 is shown, those skilled in the art can appreciate that the engine 40 typically includes multiple cylinders 44 with associated fuel injectors 46 and spark plugs 48. For example, the engine 40 may include 4, 5, 6, 8, 10, 12, or 16 cylinders 44.

Air is drawn into an intake manifold 50 of the engine 40 through an inlet 52. A throttle blade 54 regulates air flow through the inlet 52. Fuel and air are combined in the cylinder 44 and are ignited by the spark plug 48. The throttle blade 54 controls the rate that air flows into the intake manifold 50. The control module 42 adjusts the rate that fuel is injected into the cylinder 44 based on the air that is flowing into the cylinder 44 to control the air/fuel (A/F) ratio within the cylinder 44. The control module 42 communicates with an engine speed sensor 56 that generates an engine speed signal. The control module 42 also communicates with mass air flow (MAF) and manifold absolute pressure (MAP) sensors 58 and 60, respectively, which generate MAF and MAP signals, respectively.

The engine 40 includes an electronic throttle body (ETB) 62 that is associated with the throttle blade 54. The ETB 62 is controlled by the control module 42 and/or a dedicated controller such as an electronic throttle controller (ETC). First and second throttle position sensors 64 and 66, respectively, detect a position of the throttle blade 54 in the ETB 62 and generate first and second position signals that represent the position of the throttle blade 54. The first and second throttle position sensors 64 and 66, respectively, transmit the first and second position signals to the control module 42.

The vehicle 38 includes first and second accelerator pedal position sensors 68 and 70, respectively, that detect a position of an accelerator pedal 72 in the vehicle 38. The first and second accelerator pedal position sensors 68 and 70 generate first and second position signals 74 and 76, respectively, that represent the position of the accelerator pedal 72. The first and second accelerator pedal position sensors 68 and 70 transmit the first and second position signals 74 and 76, respectively, to the control module 42. The control module 42 generates a throttle adjustment signal 78 based on at least one of the first position signal 74 and/or the second position signal 76. The control module 42 transmits the throttle adjustment signal 78 to the ETB 62.

The vehicle 38 optionally includes first and second brake pedal (BP) position sensors 80 and 82, respectively, that detect a position of a BP 84 in the vehicle 38. The first and second BP position sensors 80 and 82, respectively, generate first and second position signals that represent the position of the BP 84. The first and second BP position sensors 80 and 82, respectively, transmit the first and second position signals to the control module 42. In the case of a manual transmission, the vehicle 38 optionally includes first and second clutch pedal (CP) position sensors 86 and 88, respectively, that detect a position of a CP 90 in the vehicle 38. The first and second CP position sensors 86 and 88, respectively, generate first and second position signals that represent the position of the CP 90. The first and second CP position sensors 86 and 88, respectively, transmit the first and second position signals to the control module 42. Those skilled in the art can appreciate that sensors other than those shown in FIG. 2 may be employed. Additionally, the control module 42 may receive position signals 74 and 76 from more than two position sensors for added redundancy.

It is possible to utilize only the first throttle position sensor 64 and still obtain redundant measurements of the position of the throttle blade 54. For example, other sensors such as the MAF and MAP sensors 58 and 60, respectively, indicate a flow rate and/or a pressure of the air in the intake manifold 50 that may be used to determine a position of the throttle blade 54. In this case, the control module 42 receives only the position signal from the first throttle position sensor 64. However, it is difficult to accurately compare the position of the throttle blade 54 from the first throttle position sensor 64 and from the MAF and/or MAP sensors 58 and/or 60, respectively, in both static and dynamic vehicle 38 conditions. Regardless of the availability of other sensors, it is desirable to utilize both the first and second accelerator pedal position sensors 68 and 70, respectively. A failure of a single accelerator pedal position sensor 68 or 70 results in a single-point failure and prevents the control module 42 from accurately detecting a position of the accelerator pedal 72.

The control module 42 determines a position of a device 72 in the vehicle 38 based on values of respective first and second position signals 74 and 76, respectively. For example, the values of the position signals 74 and 76 may be voltages that range between a supply potential from a power source in the control module 42 and a ground potential. In an exemplary embodiment, the control module 42 converts the position values into normalized values that represent a fraction of a range between minimum and maximum positions of the device 72. For example, a minimum position of the accelerator pedal 72 may correspond to a condition where a driver does not contact the accelerator pedal 72. A maximum position of the accelerator pedal 72 may correspond to a condition where the driver presses the accelerator pedal 72 to a maximum displacement.

In this case, a normalized position value of 0% may correspond with the minimum position, and a normalized position value of 100% may correspond with the maximum position for each accelerator pedal position sensor 74 and 76. In an exemplary embodiment, positions of the vehicle devices 72 are fixed during a calibration process so that the position sensors 68 and 70 output position signals 74 and 76 with predetermined values. For example, the first and second accelerator pedal position sensors 68 and 70, respectively, may be preset to output position signals 74 and 76 with predetermined values when the accelerator pedal 72 is fixed at a maximum displacement position. The control module 42 may scale values of the position signals 74 and 76 between the preset position value and a position value that is learned during normal operations to determine a position of the accelerator pedal 72.

Figure 3:
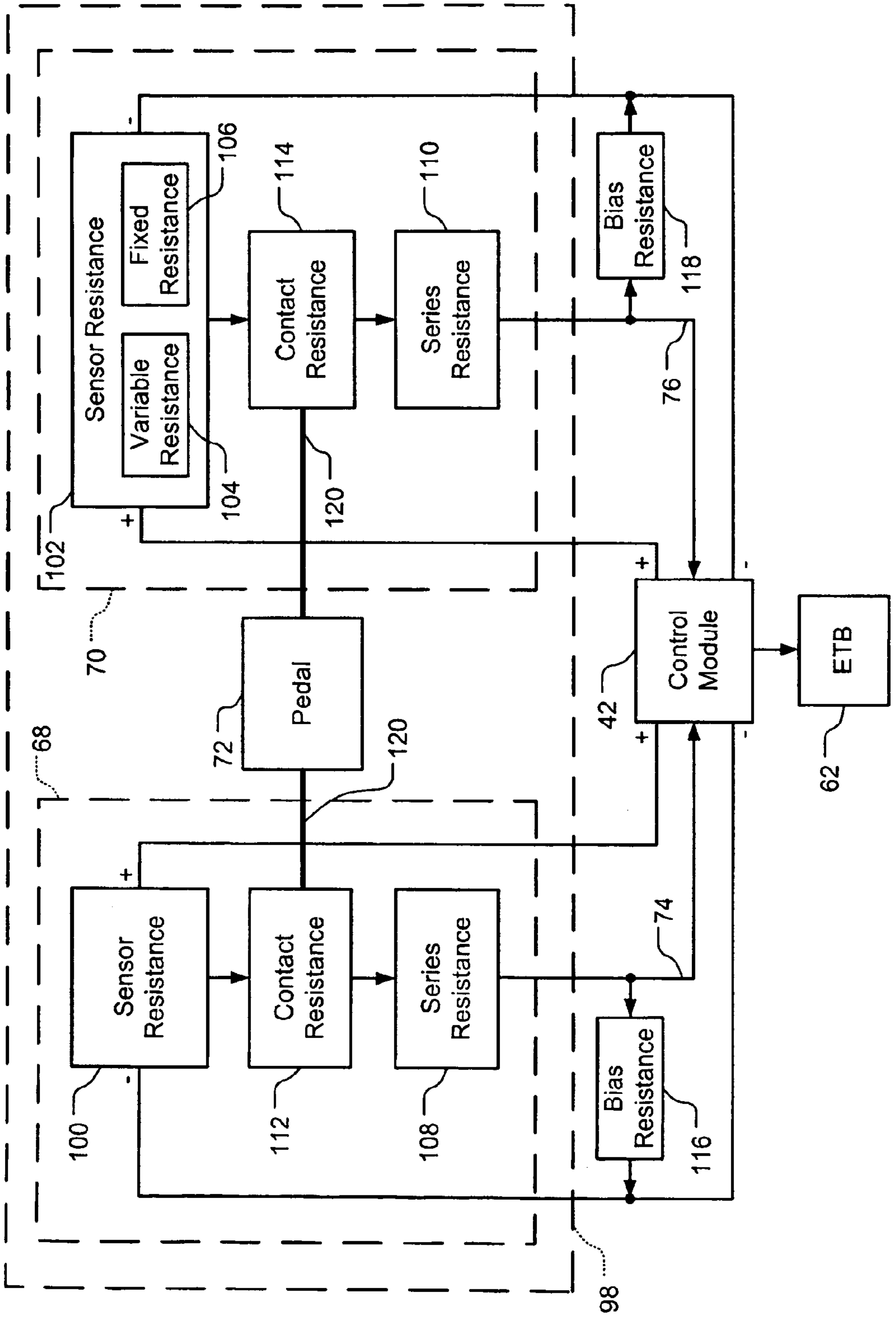
FIG. 3 is a functional block diagram of a control module, an electronic throttle body, and an accelerator pedal module that includes pedal position sensors for redundant position sensing in a vehicle control system according to the present invention.

Referring now to FIG. 3, in an exemplary embodiment, the first and second accelerator pedal position sensors 68 and 70, respectively, and the accelerator pedal 72 are contained within an accelerator pedal module 98. An exemplary embodiment of the present invention is outlined below with respect to position sensing of the accelerator pedal 72. However, analogous operation of the accelerator pedal position sensors 68 and 70 and the control module 42 is contemplated with respect to position sensing of other vehicle devices including the throttle blade 54, the brake pedal 84, and the clutch pedal 90.

The accelerator pedal position sensors 68 and 70 are potentiometer-based sensors and include first and second sensor resistances 100 and 102, respectively. For example, each of the sensor resistances 100 and 102 may include first and second terminals and an adjustable terminal. A position of an adjustable terminal determines a fraction of the maximum value of a sensor resistance 100 or 102 that is detected at the adjustable terminal. The position signals 74 and 76 that are generated by the accelerator pedal position sensors 68 and 70 have values based on the positions of the adjustable terminals. In an exemplary embodiment, the second sensor resistance 102 includes a variable resistance 104 and a fixed resistance 106. In this case, a minimum value of the second sensor resistance 102 that is detected at the adjustable terminal of the second sensor resistance 102 is limited to the value of the fixed resistance 106. Additionally, a composition of the fixed resistance 106 may be more uniform than a composition of the variable resistance 104.

The first and second accelerator pedal position sensors 68 and 70 also include first and second series resistances 108 and 110, respectively. The series resistances 108 and 110 communicate with respective adjustable terminals of the sensor resistances 100 and 102 and generate the position signals 74 and 76. In an exemplary embodiment, the sensor resistances 100 and 102 and the series resistances 108 and 110 are generated by a resistive ink deposition process. For example, resistive ink may be deposited on a non-conducting substrate to generate the resistances.

Contact resistances 112 and 114 are typically generated between the adjustable terminals and internal resistive surfaces of the sensor resistances 100 and 102. For example, a wiper contact of an adjustable terminal may include one or more brushes that contact an internal resistive surface that is generated by ink deposition. A contact resistance 112 or 114 that may vary over time is generated between the brushes and the resistive surface. Therefore, the contact resistances 112 and 114 affect the values of the position signals 74 and

76 generated by the accelerator pedal position sensors 68 and 70. First and second contact resistances 112 and 114 in the first and second accelerator pedal position sensors 68 and 70, respectively, are diagrammatically indicated in FIG. 3.

The first terminals of the sensor resistances 100 and 102 communicate with a supply potential that is generated by the control module 42. The second terminals of the sensor resistances 100 and 102 communicate with a ground potential that is also generated by the control module 42. The applied voltages generate current through the sensor resistances 100 and 102, contact resistances 112 and 114, and series resistances 108 and 110. Positions of the adjustable terminals in the sensor resistances 100 and 102 determine the voltages that are produced at the outputs of the series resistances 108 and 110 and transmitted to the control module 42. A first bias resistance 116 communicates with the first series resistance 108 and the ground potential, and a second bias resistance 118 communicates with the second series resistance 110 and the ground potential. For example, the first and second bias resistances 116 and 118, respectively, may be pull-down resistors that are included in the control module 42.

The accelerator pedal 72 is in mechanical contact with the accelerator pedal position sensors 68 and 70. Mechanical connections 120 between the accelerator pedal 72 and contact resistances 112 and 114 are diagrammatically shown in FIG. 3. However, in an exemplary embodiment, wiper contacts that contact the sensor resistances 100 and 102 are mechanically linked to the movement of the accelerator pedal 72. For example, as the accelerator pedal 72 moves between the minimum and maximum positions, positions of the adjustable terminals in the sensor resistances 100 and 102 are adjusted.

The positions of the adjustable terminals determine voltages that are detected at outputs of the series resistances 108 and 110 and transmitted to the control module 42 via the position signals 74 and 76. In an exemplary embodiment, the voltage that is detected at the output of the first series resistance 108 increases as the accelerator pedal 72 moves between the minimum position and the maximum position. This corresponds with the throttle blade 54 moving between an idle position and a wide open throttle (WOT) position. Simultaneously, the voltage that is detected at the output of the second series resistance 110 also increases as the accelerator pedal 72 moves between the minimum and maximum positions.

In an exemplary embodiment, the voltage that is detected at the output of the first series resistance 108 increases at twice the rate that the voltage that is detected at the output of the second series resistance 110 increases. The control module 42 generates the throttle adjustment signal 78 based on at least one of the voltage that is detected at the output of the first series resistance 108 and/or the voltage that is detected at the output of the second series resistance 110. The control module 42 transmits the throttle adjustment signal 78 to the ETB 62.

Figure 4:
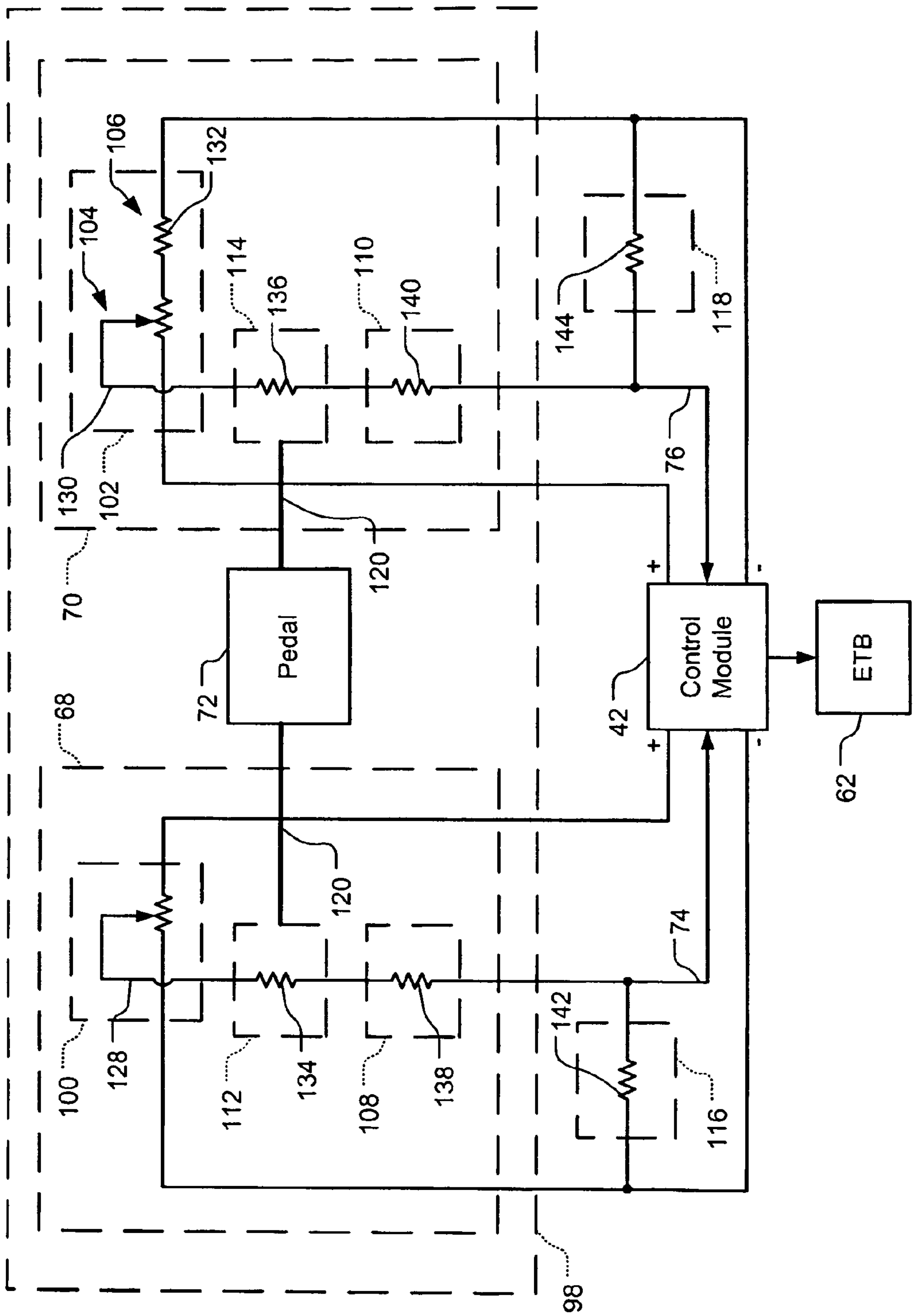
FIG. 4 is a functional block diagram and electrical schematic of the vehicle control system in FIG. 3 illustrated in further detail.

Referring now to FIG. 4, the first sensor resistance 100 and the variable resistance 104 include first and second adjustable resistors 128 and 130, respectively. Additionally, the fixed resistance 106 includes a fixed resistor 132. First terminals of the adjustable resistors 128 and 130 communicate with the supply potential. A second terminal of the second adjustable resistor 130 communicates with a first end of the fixed resistor 132. A second terminal of the first adjustable resistor 128 and a second end of the fixed resistor 132 communicate with the ground potential.

The first and second contact resistances 112 and 114, respectively, are diagrammatically indicated by first and second resistors 134 and 136, respectively. First ends of the first and second resistors 134 and 136 communicate with adjustable terminals of the first and second adjustable resistors 128 and 130, respectively. The first and second series resistances 108 and 110 include third and fourth resistors 138 and 140, respectively. First ends of the third and fourth resistors 138 and 140 communicate with second ends of the first and second resistors 134 and 136, respectively.

Second ends of the third and fourth resistors 138 and 140, respectively, communicate with the control module 42. The first and second bias resistances 116 and 118 include fifth and sixth resistors 142 and 144, respectively. A first end of the fifth resistor 142 communicates with a second end of the third resistor 138, and a second end of the fifth resistor 142 communicates with the second terminal of the first adjustable resistor 128. A first end of the sixth resistor 144 communicates with the second end of the fourth resistor 140, and a second end of the sixth resistor 144 communicates with the second end of the fixed resistor 132. In an exemplary embodiment, the fifth and sixth resistors 142 and 144, respectively, are 220 kΩ and have tolerances that are approximately equal to 7.0%.

Referring now to FIG. 5, the vehicle control system of the present invention diagnoses a short-circuit condition between the first and second accelerator pedal position sensors 68 and 70, respectively, without the use of a short-circuit switch. Additionally, the short-circuit detection process does not interfere with vehicle system diagnostics that utilize position signals 74 and 76 from the accelerator pedal position sensors 68 and 70. This is accomplished by utilizing predetermined resistor values and tolerances for the sensor resistances 100 and 102 and the series resistances 108 and 110. Additionally, sufficient knowledge of the range of possible contact resistances 112 and 114 increases the reliability of the short-circuit detection process.

As discussed above, the value of the first position signal 74 increases at a first rate while the value of the second position signal 76 increases at a second rate as the accelerator pedal 72 moves between the minimum and maximum positions. In an exemplary embodiment, the value of the first position signal 74 increases at twice the rate that the value of the second position signal 76 increases. Additionally, the range of values for the first position signal 74 is different than the range of values for the second position signal 76. For example, the range of values for the second position signal 76 may be half the size of the range of values for the first position signal 74.

In an exemplary embodiment, the minimum value of the second position signal 76 is equal to half of the minimum value of the first position signal 74, and the maximum value of the second position signal 76 is equal to half of the maximum value of the first position signal 74. For example, the value of the first position signal 74 may increase from 20% of the supply potential to 84% of the supply potential. In this case, the value of the first position signal 74 increases from 1.0V to 4.2V when the supply potential is equal to 5V.

Therefore, the value of the second position signal 76 increases from 0.5V (10% of 5.0V) to 2.1V (42% of 5V). In an exemplary embodiment, the tolerance for the high and low values of the first position signal 74 is equal to 3.5%. In this case, the tolerance for the high and low values of the second position signal 76 is equal to 1.75%. During a short-circuit condition between the accelerator pedal position sensors 68 and 70, the values of the position signals 74 and 76 are equal. Since the values of the position signals 74 and 76 simultaneously increase on different scales and different ranges, the likelihood that the values of the position signals 74 and 76 are equal during normal operations is very low.

FIG. 5 illustrates exemplary resistor values for the sensor resistances 100 and 102 and series resistances 108 and 110. As discussed above, the sensor resistances 100 and 102 and series resistances 108 and 110 may be generated by an ink deposition process. Resistors generated by an ink deposition process typically have an appreciable tolerance from a nominal value. For example, resistors generated by an ink deposition process may have a tolerance of 20% from a nominal value.

The first sensor resistance 100 has a nominal value of 1200Ω and a tolerance of 33.33%. This corresponds with a minimum value of 800Ω, a maximum value of 1600Ω, and maximum to minimum value ratio of 2.00. The first series resistance 108 has a nominal value of 1000Ω and a tolerance of 40.0%. This corresponds with a minimum value of 600Ω, a maximum value of 1400Ω, and a maximum to minimum value ratio of 2.33. The second sensor resistance 102 has a nominal value of 1700Ω and a tolerance of −11.77% and +47.06%. This corresponds with a minimum value of 1500Ω, a maximum value of 2500Ω, and a maximum to minimum value ratio of 1.66.

The second sensor resistance 102 includes positive and negative tolerances that are not equal because the second sensor resistance 102 includes both the variable resistance 104 and the fixed resistance 106. For example, the compositions of the variable resistance 104 and the fixed resistance 106 may be non-uniform. The second series resistance 110 has a nominal value of 1000Ω and a tolerance of 40.0%. This corresponds with a minimum value of 600Ω, a maximum value of 1400Ω, and a maximum to minimum value ratio of 2.33. An observed value for the contact resistances 112 and 114 ranges between 150Ω and 2500Ω.

The table in FIG. 5 includes combined values for the first and second series resistances 108 and 110 and the first and second contact resistances 112 and 114, respectively. For example, the value of the combination of the first series resistance 108 and the first contact resistance 134 ranges between 750Ω and 3900Ω, with a nominal value of 1000Ω and a maximum to minimum value ratio of 5.20. The combination of the second series resistance 110 and the second contact resistance 136 has a nominal value of 1000Ω and a tolerance of −25.0% and +290.0%. This corresponds with a minimum value of 750Ω, a maximum value of 3900Ω, and a maximum to minimum value ratio of 5.20.

Figure 6:
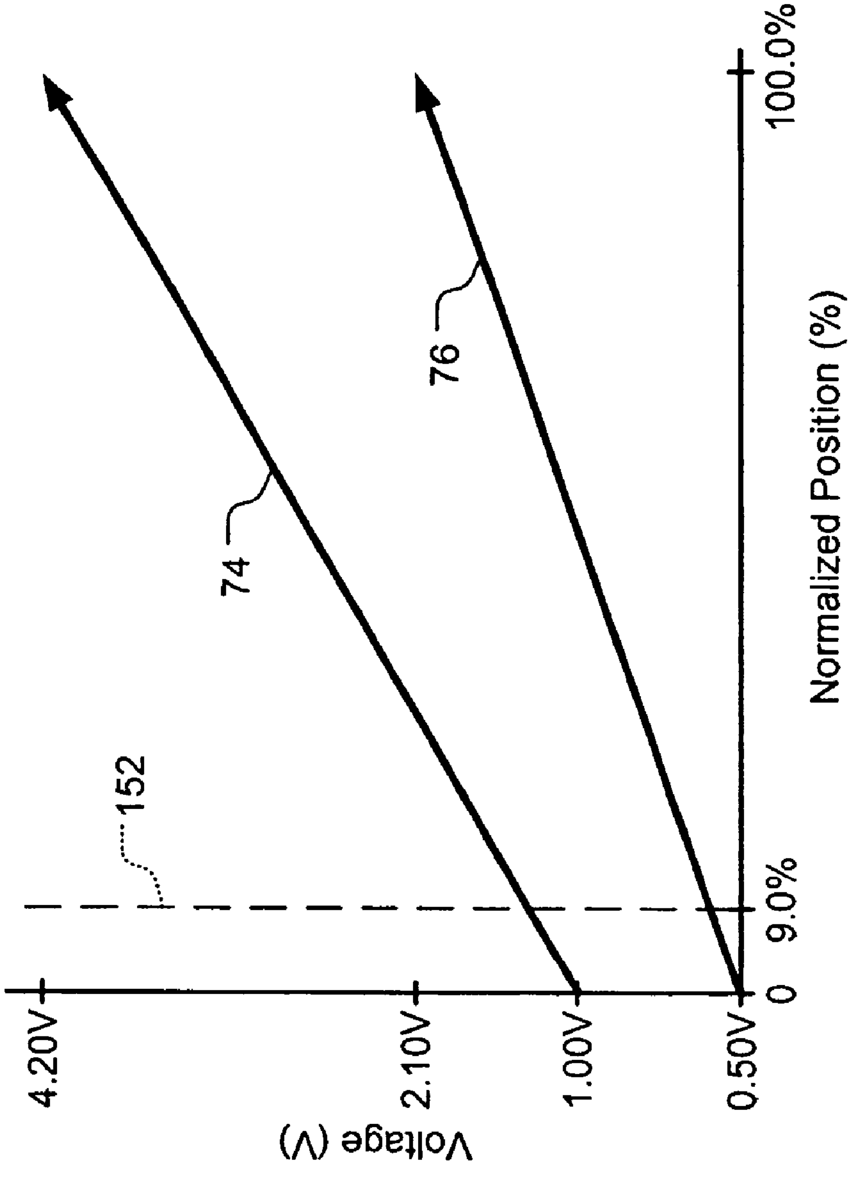
FIG. 6 illustrates exemplary values of the position signals generated by the pedal position sensors as a function of the normalized position of the accelerator pedal.

Referring now to FIG. 6, the values of the first and second position signals 74 and 76, respectively, are not equal during normal operations and when there are no faults. Therefore, the control module 42 detects a short-circuit condition between the accelerator pedal position sensors 68 and 70 by reading the values of the position signals 74 and 76. In an exemplary embodiment, the control module 42 detects a short-circuit condition when the difference between the values of the positions signals 74 and 76 is less than a predetermined value. However, the control module 42 also conducts correlation error testing during normal operations to ensure that the detected positions of the accelerator pedal 72 are sufficiently close in value.

To simplify a comparison of the detected positions of the accelerator pedal 72, the control module 42 first converts the first and second position values into normalized position values. The normalized position values represent a fraction of a range between minimum and maximum positions of the accelerator pedal 72. In an exemplary embodiment, the control module 42 computes the first and second normalized position values with respect to the range of values for the first position signal 74.

The minimum and maximum values of the second position signal 76 are equal to half of the minimum and maximum values of the first position signal 74, respectively. Therefore, the control module 42 doubles the value of the second position signal 76 and computes the second normalized position value with respect to the range of values for the first position signal 74. For example, if the value of the second position signal 76 is equal to 1.0V, the value of the second position signal 76 is equal to 31.25% of the range of values for the second position signal 76. Doubling the value of the second position signal 76 produces 2.0V, which is equal to 31.25% of the range of values for the first position signal 74.

The control module 42 computes the difference between the first and second normalized position values. The control module 42 detects a correlation error when the difference between the first and second normalized position values is greater than a predetermined value. For example, a sensor error and/or a short-circuit condition may exist when the difference between the first and second normalized position values is greater than the predetermined value. In an exemplary embodiment, the predetermined value is equal to 5.0%.

Additionally, the predetermined value may vary based on the detected position of the accelerator pedal 72. This is because a greater correlation error may be tolerated without consequence as the position of the accelerator pedal 72 moves towards the maximum position. For example, the predetermined value may range from 5.0% when the accelerator pedal 72 is at the minimum position to 10.0% when the accelerator pedal 72 is at the maximum position. In an exemplary embodiment, the control module 42 only detects a sensor error when the correlation error is detected for a predetermined number of consecutive cycles. This allows the difference between the first and second normalized position values to return to an allowable value before declaring a sensor error.

The control module 42 adjusts a position of the throttle blade 54 in the ETB 62 based on at least one of the first normalized position value and/or the second normalized position value. When the control module 42 has detected no correlation errors, the control module 42 adjusts the position of the throttle blade 54 based on an average of the first and second normalized position values. However, the control module 42 initiates a limited throttle condition after a first correlation error is detected.

During the limited throttle condition, the control module 42 adjusts the position of the throttle blade 54 based only on the lower of the first and second normalized position values. This is because it is more advantageous to defer to a lower value in order to prevent an off-idle condition when a discrepancy exists between detected positions of the accelerator pedal 72. An off-idle condition occurs when a vehicle 38 accelerates beyond an idle speed while a driver makes no contact with the accelerator pedal 72, which is undesirable.

In an exemplary embodiment, the limited throttle condition remains active until the engine 40 is deactivated. The control module 42 optionally deactivates the limited throttle condition when the engine 40 is subsequently activated until another correlation error is detected. In an exemplary embodiment, the control module 42 refrains from adjusting the position of the throttle blade 54 during the limited throttle condition and while at least one of the normalized position values is less than a predetermined value (indicated by 152 in FIG. 6). For example, the predetermined value may be equal to 9.0%.

Suspending throttle control while at least one of the normalized position values is less than a predetermined value helps to prevent an off-idle condition. Depending on the value of the correlation error limit, the predetermined value may be increased or decreased. For example, if the correlation error limits is greater than 5.0%, the predetermined value may be set to a value less than 9.0%. Once both of the normalized position values are subsequently greater than the predetermined value, the control module 42 resumes adjusting the position of the throttle blade 54 based on the lower of the normalized position values.

Figure 7:
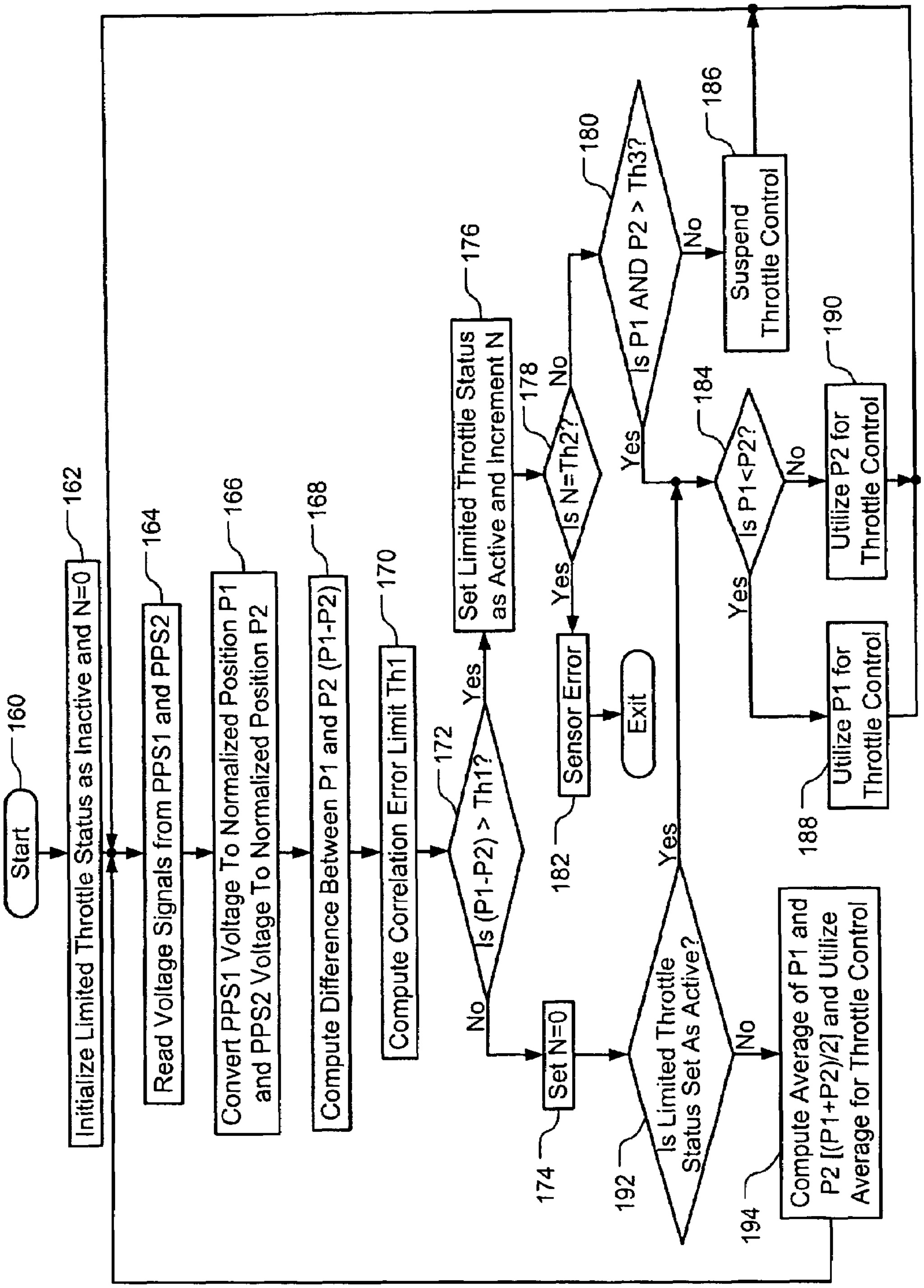
FIG. 7 is a flowchart illustrating steps performed by the control module to verify redundant position sensing by the pedal position sensors and to avoid adverse effects due to a short-circuit condition.

Referring now to FIG. 7, a short-circuit detection algorithm begins in step 160. In step 162, the control module 42 initializes the limited throttle status as inactive and sets a variable N equal to zero. In step 164, the control module 42 reads the values of the first and second position signals 74 and 76, respectively. In step 166, the control module 42 converts the first and second position values into first and second normalized position values, respectively. In step 168, the control module 42 computes the difference between the first and second normalized position values. In step 170, the control module 42 computes the current correlation error limit based on the detected position of the accelerator pedal 72. In step 172, control determines whether the difference between the first and second normalized position values is greater than a first predetermined value. If false, control proceeds to step 174. If true, control proceeds to step 176.

In step 176, the control module 42 sets the limited throttle status as active and increments N. In step 178, control determines whether N is equal to a second predetermined value. If false, control proceeds to step 180. If true, control proceeds to step 182. In step 182, the control module 42 detects a sensor error and control ends. For example, the control module 42 may activate an alarm indicator in step 182. In step 180, control determines whether both the first and second normalized position values are greater than a third predetermined value. If true, control proceeds to step 184. If false, control proceeds to step 186. In step 186, the control module 42 suspends throttle control and control returns to step 164.

In step 184, control determines whether the first normalized position value is less than the second normalized position value. If true, control proceeds to step 188. If false, control proceeds to step 190. In step 188, the control module 42 utilizes the first normalized position value for throttle control and control returns to step 164. In step 190, the control module 42 utilizes the second normalized position value for throttle control and control returns to step 164. In step 174, the control module 42 sets N equal to zero. In step 192, control determines whether the limited throttle status is set as active. If true, control proceeds to step 184. If false, control proceeds to step 194. In step 194, the control module 42 computes the average of the first and second normalized position values and utilizes the average for throttle control and control returns to step 164.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A control system, comprising:

a device having a position between minimum and maximum positions;

first and second sensor modules that sense said position of said device and that generate first and second position values, respectively; and a control module that receives said first and second position values and that computes first and second normalized position values that represent a fraction of a range between minimum and maximum values of said first position value and between minimum and maximum values of said second position value, respectively, wherein said control module suspends a control procedure that is based on at least one of said first normalized position value and/or said second normalized position value while a difference between said first and second normalized position values is greater than or equal to a first predetermined value and while at least one of said first normalized position value and/or said second normalized position value is less than or equal to a second predetermined value.

2. The control system of claim 1 wherein said first and second position values increase as said device moves from said minimum position to said maximum position.

3. The control system of claim 2 wherein a minimum value of said first position value is greater than a minimum value of said second position value and wherein a maximum value of said first position value is greater than a maximum value of said second position value.

4. The control system of claim 2 wherein said first and second position values increase at different rates as said device moves from said minimum position to said maximum position.

5. The control system of claim 1 wherein said first predetermined value increases as said device moves from said minimum position to said maximum position.

6. The control system of claim 1 wherein said control module activates an alarm indicator when said difference between said first and second normalized position values is greater than or equal to said first predetermined value for a predetermined time period.

7. The control system of claim 1 wherein said control module conducts said control procedure based on the lower of said first or second normalized position values when said difference between said first and second normalized position values is greater than or equal to said first predetermined value and said first and second normalized position values are both greater than said second predetermined value.

8. The control system of claim 1 wherein said control module conducts said control procedure based on an average of said first and second normalized position values when said difference between said first and second normalized position values is less than said first predetermined value.

9. The control system of claim 1 wherein, after said control module previously detects that said difference between said first and second normalized position values is greater than or equal to said first predetermined value, said control module conducts said control procedure based on the lower of said first or second normalized position values when said control module subsequently detects that said difference between said first and second normalized position values is less than said first predetermined value.

10. The control system of claim 1 wherein said first and second sensor modules include first and second sensor resistances, respectively, wherein values of said first and second sensor resistances both one of increase or decrease as said device moves from said minimum position to said maximum position, and wherein said first and second sensor modules generate said first and second position values based on said first and second sensor resistances, respectively.

11. The control system of claim 10 wherein said first and second sensor resistances are generated during a resistive ink deposition process.

12. The control system of claim 1 further comprising first and second conductors having first ends that communicate with said first and second sensor modules, respectively, and second ends that communicate with said control module, wherein said first sensor module transmits said first position values on said first conductor and said second sensor module transmits said second position values on said second conductor.

13. The control system of claim 1 wherein said device is one of an accelerator pedal, a brake pedal, a clutch pedal, or a throttle blade of a vehicle.

14. The control system of claim 13 wherein said device is an accelerator pedal and wherein said control module adjusts a position of a throttle blade of said vehicle during said control procedure.

15. The control system of claim 1 wherein said first predetermined value is greater than or equal to 0.05 and said second predetermined value is less than or equal to 0.09.

16. A vehicle control system, comprising:

an accelerator pedal having a position between minimum and maximum positions;

first and second sensor modules that sense said position of said accelerator pedal and that generate first and second position values, respectively;

a control module that receives said first and second position values and that computes first and second normalized position values that represent a fraction of a range between minimum and maximum values of said first position value and between minimum and maximum values of said second position value, respectively; and a throttle blade, wherein said control module adjusts a position of said throttle blade based on at least one of said first normalized position value and/or said second normalized position value, wherein said control module foregoes adjusting said position of said throttle blade while a difference between said first and second normalized position values is greater than or equal to 0.05 and while at least one of said first normalized position value and/or said second normalized position value is less than or equal to 0.09.

* * * * *